US012794229B2

(12) United States Patent
He et al.

(10) Patent No.: US 12,794,229 B2
(45) Date of Patent: Nov. 10, 2026

(54) POWER SUPPLY SYSTEM AND CONTROL METHOD THEREOF

(71) Applicant: Huawei Digital Power Technologies Co., Ltd., Shenzhen (CN)

(72) Inventors: Jinwei He, Tianjin (CN); Tian Tan, Singapore (SG); Kai Xin, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/080,031

(22) Filed: Mar. 14, 2025

(65) Prior Publication Data

US 2025/0210993 A1 Jun. 26, 2025

Related U.S. Application Data

(63) Continuation of application No. PCT/CN2023/101352, filed on Jun. 20, 2023.

(30) Foreign Application Priority Data

Sep. 16, 2022 (CN) ......................... 202211131357.4

(51) Int. Cl.
*H02J 3/0014* (2026.01)
*H02J 3/18* (2006.01)
(Continued)

(52) U.S. Cl.
CPC ............ *H02J 3/00142* (2026.01); *H02J 3/18* (2013.01); *H02J 3/381* (2013.01); *H02J 2101/24* (2026.01)

(58) Field of Classification Search
CPC .......... H02J 3/00142; H02J 3/18; H02J 3/381; H02J 2101/24; H02J 2103/35;
(Continued)

(56) References Cited

U.S. PATENT DOCUMENTS

| | | | | |
|---|---|---|---|---|
| 8,716,888 | B2 | 5/2014 | Watanabe et al. | |
| 2021/0143642 | A1 | 5/2021 | Gupta et al. | |
| 2022/0077688 | A1 * | 3/2022 | Patarroyo | H02J 3/46 |

FOREIGN PATENT DOCUMENTS

| | | | |
|---|---|---|---|
| CN | 108493958 | A | 9/2018 |
| CN | 114597911 | A | 6/2022 |
| CN | 114884100 | A | 8/2022 |
| CN | 115498631 | A | 12/2022 |
| WO | 2016062316 | A1 | 4/2016 |

OTHER PUBLICATIONS

Jan Shair et al, "Hardware-in-the-loop and Field Validation of a Rotor-side Subsynchronous Damping Controller for a Series Compensated DFIG System," Apr. 22, 2020, total 11 pages.

(Continued)

*Primary Examiner* — Richard Tan
(74) *Attorney, Agent, or Firm* — Conley Rose, P.C.

(57) ABSTRACT

A power supply system includes N distributed generations and at least one detection control unit. The N distributed generations are connected in parallel or in series and then connected to a power grid, and N is an integer greater than 1. The detection control unit is configured to: when detecting that oscillation of the power supply system exceeds a preset threshold range, obtain a power compensation control proportion of each distributed generation based on impedance from each distributed generation to a point of common coupling of the power supply system. The power compensation control proportion is a proportion of power output by each distributed generation to total power output by the power supply system. The detection control unit is further configured to control a power output proportion of each distributed generation based on the power compensation control proportion.

20 Claims, 4 Drawing Sheets

(51) Int. Cl.
*H02J 3/38* (2006.01)
*H02J 101/24* (2026.01)

(58) Field of Classification Search
CPC .... H02J 3/0014; H02J 3/38; H02J 3/46; H02J 3/48; H02J 3/50; H02J 3/002
USPC .......................................................... 307/31
See application file for complete search history.

(56) References Cited

OTHER PUBLICATIONS

Xu Zhang et al, "A Grid-side Subsynchronous Damping Controller to Mitigate Unstable SSCI and its Hardware-in-the-loop Tests," Jul. 23, 2019, total 10 pages.
"Action plan for carbon peaking before 2030," Oct. 26, 2021, total 28 pages.
Xiaorong Xie et al, "Advances on power system oscillation," Dec. 16, 2019, total 11 pages.
China Electric Power News Network, "Analysis of China"s Electric Power Development and Reform Situation (2022), Apr. 2, 2022, total 24 pages.
"Technical Report on the events of Aug. 9, 2019," National Grid ESO LFDD Sep. 8, 2019 Incident Report, Sep. 6, 2019, total 37 pages.
Huakun Liu et al, "Subsynchronous Interaction between Di-rect-Drive PMSG Based Wind Farms and Weak AC Networks," Mar. 14, 2017, total 12 pages.
Shu Yinbiao et al, "Research on the path of carbon peak and carbon neutrality of China''s electric power," Oct. 18, 2021, total 14 pages.
Xiaorong Xie et al, "Characteristic Analysis of Subsynchronous Resonance in Practical Wind Farms Connected to Series-compensated Transmissions," Mar. 1, 2017, total 9 pages.

* cited by examiner

POWER SUPPLY SYSTEM AND CONTROL METHOD THEREOF

CROSS-REFERENCE TO RELATED APPLICATIONS

This is a continuation of International Patent Application No. PCT/CN2023/101352 filed on Jun. 20, 2023, which claims priority to Chinese Patent Application No. 202211131357.4 filed on Sep. 16, 2022. The disclosures of the aforementioned applications are hereby incorporated by reference in their entireties.

TECHNICAL FIELD

This application relates to the field of electronic power technologies, and in particular, to a power supply system and a control method thereof.

BACKGROUND

As a proportion of wind-solar new energy yields continuously increases, and application of power electronic apparatuses continuously grows, a problem of wide-frequency oscillation in new power systems becomes increasingly prominent. Oscillation in the power system can be defined as multi-timescale dynamic interaction that is between a source/device and a grid and that is formed by coupling a renewable energy unit, an alternating current/direct current converter, and control of the alternating current/direct current converter through a complex power grid. In a power electronic device, a response timescale of a control step is wide (from a level less than 1 millisecond (ms) to a level of seconds(s)). As a result, a new power system in which power electronic devices are widely used generates wide-frequency oscillation whose frequency ranges from several hertz (Hz) to kilohertz (kHz).

Wide-frequency oscillation of a power supply system has the following disadvantages: (1) A device is damaged. The oscillation spreads quickly in the system. This triggers overvoltage and overcurrent of the device before a protection relay acts. (2) Power supply reliability is weakened. The oscillation may cause generator tripping. This causes a loss of an energy yield of a new energy site and even causes large-scale power outage, and affects power supply safety and stability of the system. (3) Quality of electric energy is affected. The oscillation may generate large harmonics and interharmonics. Therefore, to improve reliability of power supply systems such as a photovoltaic power station, an energy storage power station, and a microgrid, a wide-frequency oscillation suppression technology may be required. However, in an existing solution for suppressing wide-frequency oscillation, system stability is poor, implementation complexity is high, and implementation costs are high.

SUMMARY

Embodiments of this application provide a power supply system and a control method thereof, to suppress oscillation of the power supply system and ensure normal and stable operation of the power supply system.

According to a first aspect, an embodiment of this application provides a power supply system. The power supply system includes N distributed generations and at least one detection control unit, the N distributed generations are connected in parallel or in series and then connected to a power grid, and N is an integer greater than 1. The detection control unit is configured to: when detecting that oscillation of the power supply system exceeds a preset threshold range, obtain a power compensation control proportion of each distributed generation based on impedance from each distributed generation to a point of common coupling of the power supply system. The power compensation control proportion is a proportion of power output by each distributed generation to total power output by the power supply system. The detection control unit is further configured to control a power output proportion of each distributed generation based on the power compensation control proportion.

When it is detected that the oscillation of the power supply system exceeds the preset threshold range, a power compensation control proportion of each distributed generation is adjusted based on the impedance from each distributed generation to the point of common coupling of the power supply system, so that the power output proportion of each distributed generation is controlled based on the adjusted power compensation control proportion. In this way, the oscillation of the power supply system is suppressed, and normal and stable operation of the power supply system is ensured. In addition, low implementation complexity and low implementation costs can be achieved without changing an original control circuit or adding an additional device.

In a possible design, the detection control unit is further configured to: when impedance from a first distributed generation in the N distributed generations to the point of common coupling is greater than a first threshold, control active power output by the first distributed generation to be less than first preset power. Alternatively, the detection control unit is further configured to: when impedance from a first distributed generation to the point of common coupling is less than or equal to a first threshold, control active power output by the first distributed generation to be greater than or equal to first preset power. That is, larger impedance from any one of the N distributed generations to the point of common coupling indicates lower active power output by the distributed generation, and smaller impedance from any one of the N distributed generations to the point of common coupling indicates higher active power output by the distributed generation. Active power output by each distributed generation is adjusted, so that the oscillation of the power supply system is suppressed, and the power supply system is ensured to resume the normal and stable operation.

In another possible design, the detection control unit is further configured to: when impedance from a second distributed generation in the N distributed generations to the point of common coupling is greater than a second threshold, control reactive power output by the second distributed generation to be greater than second preset power. Alternatively, the detection control unit is further configured to: when impedance from a second distributed generation to the point of common coupling is less than or equal to a second threshold, control reactive power output by the second distributed generation to be less than or equal to second preset power. That is, larger impedance from any one of the N distributed generations to the point of common coupling indicates higher reactive power output by the distributed generation, and smaller impedance from any one of the N distributed generations to the point of common coupling indicates lower reactive power output by the distributed generation. Reactive power output by each distributed generation is adjusted, so that the oscillation of the power supply system is suppressed, and the power supply system is ensured to resume the normal and stable operation.

In another possible design, the detection control unit is further configured to: when it is detected that the oscillation of the power supply system exceeds the preset threshold range, control a sum of active power output by the N distributed generations to be equal to total active power output by the power supply system before the oscillation of the power supply system exceeds the preset threshold range; and control a sum of reactive power output by the N distributed generations to be equal to total reactive power output by the power supply system before the oscillation of the power supply system exceeds the preset threshold range. That is, on the premise that the total active power and the total reactive power that are output by the power supply system are not changed, the active power and the reactive power that are output by each distributed generation are adjusted, so that the oscillation of the power supply system is suppressed, and the power supply system is ensured to resume the normal and stable operation.

In another possible design, the power compensation control proportion includes an active power compensation control proportion, and the active power compensation control proportion is a proportion of the active power output by each distributed generation to the total active power output by the power supply system. The detection control unit is further configured to: when it is detected that the oscillation of the power supply system exceeds the preset threshold range, number each distributed generation in ascending order of impedance from distributed generations to the point of common coupling, obtain the active power compensation control proportion of each distributed generation based on a number of each distributed generation and N, and control, based on the active power compensation control proportion, each distributed generation to output the active power.

In another possible design, the active power compensation control proportion $\varepsilon_{p(k)}$ of a distributed generation numbered k in the N distributed generations satisfies:

$$\varepsilon_{p(k)} = \frac{1}{N} - \left(k - \frac{N}{2}\right)G_{reg\_p};$$

and active power $P_{ref(k)}$ output by the distributed generation numbered k in the N distributed generations satisfies:

$$P_{ref(k)} = P_{all}\varepsilon_{p(k)} + (SOC_{ave} - SOC_k)G_{pi\_soc}$$

Herein, k is an integer greater than or equal to 1 and less than or equal to N, $$G_{reg\_p} = K_{p\_p} + \frac{K_{p\_i}}{s},$$

$K_{p\_p}$ is a first proportional coefficient, $K_{p\_i}$ is a first integral coefficient, s is a Laplace operator, $P_{all}$ is the total active power output by the power supply system, $SOC_{ave}$ is an average value of states of charge SOCs of the N distributed generations, $SOC_k$ is an SOC of the distributed generation numbered k, and $G_{pi\_soc}$ is a transfer function.

In another possible design, the power compensation control proportion includes a reactive power compensation control proportion, and the reactive power compensation control proportion is a proportion of the reactive power output by each distributed generation to the total reactive power output by the power supply system. The detection control unit is further configured to: when it is detected that the oscillation of the power supply system exceeds the preset threshold range, number each distributed generation in ascending order of impedance from the distributed generations to the point of common coupling, obtain the reactive power compensation control proportion of each distributed generation based on a number of each distributed generation and N, and control, based on the reactive power compensation control proportion, each distributed generation to output the reactive power.

In another possible design, a reactive power compensation control proportion $\varepsilon_{q(k)}$ of a distributed generation numbered k in the N distributed generations satisfies:

$$\varepsilon_{q(k)} = \frac{1}{N} + \left(k - \frac{N}{2}\right)G_{reg\_q};$$

and reactive power $Q_{ref(k)}$ output by the distributed generation numbered k in the N distributed generations satisfies:

$$Q_{ref(k)}Q_{all}\varepsilon_{q(k)}$$

Herein, k is an integer greater than or equal to 1 and less than or equal to N, $$G_{reg\_q} = K_{q\_p} + \frac{K_{q\_i}}{s},$$

$K_{q\_p}$ is a second proportional coefficient, $K_{q\_i}$ is a second integral coefficient, s is a Laplace operator, and Q au is the total reactive power output by the power supply system.

In the foregoing, a distributed generation is numbered in the ascending order of the impedance from the distributed generations to the point of common coupling. Smaller impedance from the distributed generation to the point of common coupling indicates a smaller number of the distributed generation, a larger active power compensation control proportion $\varepsilon_{p(k)}$, and a smaller reactive power compensation control proportion $\varepsilon_{q(k)}$. Therefore, higher active power output by the distributed generation indicates lower reactive power output by the distributed generation. Alternatively, larger impedance from the distributed generation to the point of common coupling indicates a larger number of the distributed generation, a smaller active power compensation control proportion $\varepsilon_{p(k)}$, and a larger reactive power compensation control proportion $\varepsilon_{q(k)}$. Therefore, lower active power output by the distributed generation indicates higher reactive power output by the distributed generation. The active power and the reactive power that are output by each distributed generation are dynamically adjusted, so that the oscillation of the power supply system is suppressed, and the power supply system is ensured to resume the normal and stable operation.

In another possible design, the detection control unit is further configured to: collect a current and a voltage of the point of common coupling of the power supply system, and obtain an effective value of an oscillation component of the voltage, an effective value of an oscillation component of the current, and an effective value of an oscillation component of a system frequency based on the voltage and the current of the point of common coupling. The detection control unit is further configured to: when the effective value of the oscillation component of the voltage is greater than a third threshold, the effective value of the oscillation component of the current is greater than a fourth threshold, and/or the effective value of the oscillation component of the system frequency is greater than a fifth threshold, learn that the oscillation of the power supply system exceeds the preset threshold range. The current and the voltage of the point of common coupling are collected, so that whether the oscillation of the power supply system exceeds the preset threshold range is detected, to ensure accuracy of detecting that the oscillation of the power supply system occurs. In this way, when it is detected that the oscillation of the power supply system exceeds the preset threshold range, the reactive power output by the distributed generation is adjusted, so that the oscillation of the power supply system is suppressed, and the power supply system is ensured to resume the normal and stable operation.

According to a second aspect, an embodiment of this application provides a power control method for a power supply system. The method is applicable to at least one detection control unit in the power supply system, the power supply system further includes N distributed generations, the N distributed generations are connected in parallel or in series and then connected to a power grid, and N is an integer greater than 1. In the method, when it is detected that oscillation of the power supply system exceeds a preset threshold range, a power compensation control proportion of each distributed generation is obtained based on impedance from each distributed generation to a point of common coupling of the power supply system, where the power compensation control proportion is a proportion of power output by each distributed generation to total power output by the power supply system; and a power output proportion of each distributed generation is controlled based on the power compensation control proportion.

When it is detected that the oscillation of the power supply system exceeds the preset threshold range, a power compensation control proportion of each distributed generation is adjusted based on the impedance from each distributed generation to the point of common coupling of the power supply system, so that the power output proportion of each distributed generation is controlled based on the adjusted power compensation control proportion. In this way, the oscillation of the power supply system is suppressed, and normal and stable operation of the power supply system is ensured. In addition, low implementation complexity and low implementation costs can be achieved without changing an original control circuit or adding an additional device.

In a possible design, when impedance from a first distributed generation in the N distributed generations to the point of common coupling is greater than a first threshold, active power output by the first distributed generation is controlled to be less than first preset power. Alternatively, when impedance from a first distributed generation to the point of common coupling is less than or equal to a first threshold, active power output by the first distributed generation is controlled to be greater than or equal to first preset power. That is, larger impedance from any one of the N distributed generations to the point of common coupling indicates lower active power output by the distributed generation, and smaller impedance from any one of the N distributed generations to the point of common coupling indicates higher active power output by the distributed generation. Active power output by each distributed generation is adjusted, so that the oscillation of the power supply system is suppressed, and the power supply system is ensured to resume the normal and stable operation.

In another possible design, when impedance from a second distributed generation in the N distributed generations to the point of common coupling is greater than a second threshold, reactive power output by the second distributed generation is controlled to be greater than second preset power. Alternatively, when impedance from a second distributed generation to the point of common coupling is less than or equal to a second threshold, reactive power output by the second distributed generation is controlled to be less than or equal to second preset power. That is, larger impedance from any one of the N distributed generations to the point of common coupling indicates higher reactive power output by the distributed generation, and smaller impedance from any one of the N distributed generations to the point of common coupling indicates lower reactive power output by the distributed generation. Reactive power output by each distributed generation is adjusted, so that the oscillation of the power supply system is suppressed, and the power supply system is ensured to resume the normal and stable operation.

In another possible design, when it is detected that the oscillation of the power supply system exceeds the preset threshold range, a sum of active power output by the N distributed generations is controlled to be equal to total active power output by the power supply system before the oscillation of the power supply system exceeds the preset threshold range, and a sum of reactive power output by the N distributed generations is controlled to be equal to total reactive power output by the power supply system before the oscillation of the power supply system exceeds the preset threshold range. That is, on the premise that the total active power and the total reactive power that are output by the power supply system are not changed, the active power and the reactive power that are output by each distributed generation are dynamically adjusted, so that the oscillation of the power supply system is suppressed, and the power supply system is ensured to resume the normal and stable operation.

In another possible design, the power compensation control proportion includes an active power compensation control proportion, and the active power compensation control proportion is a proportion of the active power output by each distributed generation to the total active power output by the power supply system. When it is detected that the oscillation of the power supply system exceeds the preset threshold range, each distributed generation is numbered in ascending order of impedance from the distributed generations to the point of common coupling, the active power compensation control proportion of each distributed generation is obtained based on a number of each distributed generation and N, and each distributed generation is controlled, based on the active power compensation control proportion, to output the active power.

In another possible design, an active power compensation control proportion $\varepsilon_{p(k)}$ of a distributed generation numbered k in the N distributed generations satisfies:

$$\varepsilon_{p(k)} = \frac{1}{N} - \left(k - \frac{N}{2}\right)G_{reg\_p};$$

and active power $P_{ref(k)}$ output by the distributed generation numbered k in the N distributed generations satisfies:

$$P_{ref(k)} = P_{all}\varepsilon_{p(k)} + (SOC_{ave} - SOC_k)G_{pi\_soc}$$

Herein, k is an integer greater than or equal to 1 and less than or equal to N, $$G_{reg\_p} = K_{p\_p} + \frac{K_{p\_i}}{s},$$

$K_{p\_p}$ is a first proportional coefficient, $K_{p\_i}$ is a first integral coefficient, s is a Laplace operator, $P_{all}$ is the total active power output by the power supply system, $SOC_{ave}$ is an average value of states of charge SOCs of the N distributed generations, $SOC_k$ is an SOC of the distributed generation numbered k, and $G_{pi\_soc}$ is a transfer function.

In another possible design, the power compensation control proportion includes a reactive power compensation control proportion, and the reactive power compensation control proportion is a proportion of the reactive power output by each distributed generation to the total reactive power output by the power supply system. When it is detected that the oscillation of the power supply system exceeds the preset threshold range, each distributed generation is numbered in ascending order of impedance from the distributed generations to the point of common coupling, the reactive power compensation control proportion of each distributed generation is obtained based on a number of each distributed generation and N, and each distributed generation is controlled, based on the reactive power compensation control proportion, to output the reactive power.

In another possible design, a reactive power compensation control proportion $\varepsilon_{q(k)}$ of a distributed generation numbered k in the N distributed generations satisfies:

$$\varepsilon_{q(k)} = \frac{1}{N} + \left(k - \frac{N}{2}\right)G_{reg\_q};$$

and reactive power $Q_{ref(k)}$ output by the distributed generation numbered k in the N distributed generations satisfies:

$$Q_{ref(k)}Q_{all}\varepsilon_{q(k)}$$

Herein, k is an integer greater than or equal to 1 and less than or equal to N, $$G_{reg\_q} = K_{q\_p} + \frac{K_{q\_i}}{s},$$

$K_{q\_p}$ is a second proportional coefficient, $K_{q\_i}$ is a second integral coefficient, s is a Laplace operator, and Q an is the total reactive power output by the power supply system.

In the foregoing, a distributed generation is numbered in the ascending order of the impedance from the distributed generations to the point of common coupling. Smaller impedance from the distributed generation to the point of common coupling indicates a smaller number of the distributed generation, a larger active power compensation control proportion $\varepsilon_{p(k)}$, and a smaller reactive power compensation control proportion $\varepsilon_{q(k)}$. Therefore, higher active power output by the distributed generation indicates lower reactive power output by the distributed generation. Alternatively, larger impedance from the distributed generation to the point of common coupling indicates a larger number of the distributed generation, a smaller active power compensation control proportion $\varepsilon_{p(k)}$, and a larger reactive power compensation control proportion $\varepsilon_{q(k)}$. Therefore, lower active power output by the distributed generation indicates higher reactive power output by the distributed generation. The active power and the reactive power that are output by each distributed generation are dynamically adjusted, so that the oscillation of the power supply system is suppressed, and the power supply system is ensured to resume the normal and stable operation.

In another possible design, a current and a voltage of the point of common coupling of the power supply system are collected, and an effective value of an oscillation component of the voltage, an effective value of an oscillation component of the current, and an effective value of an oscillation component of a system frequency are obtained based on the voltage and the current of the point of common coupling. When the effective value of the oscillation component of the voltage is greater than a third threshold, the effective value of the oscillation component of the current is greater than a fourth threshold, and/or the effective value of the oscillation component of the system frequency is greater than a fifth threshold, it is learned that the oscillation of the power supply system exceeds the preset threshold range. The current and the voltage of the point of common coupling are collected, so that whether the oscillation of the power supply system exceeds the preset threshold range is detected, to ensure accuracy of detecting that the oscillation of the power supply system occurs. In this way, when it is detected that the oscillation of the power supply system exceeds the preset threshold range, the reactive power output by the distributed generation is adjusted, so that the oscillation of the power supply system is suppressed, and the power supply system is ensured to resume the normal and stable operation.

According to a third aspect, this application provides a power supply system. The power supply system includes a photovoltaic array and the detection control unit that is connected to the photovoltaic array and that is provided in any one of the first aspect or the possible implementations of the first aspect. The photovoltaic array is configured to supply power to a power grid by using converted electric energy. In the detection control unit, a voltage and a current of a point of common coupling are detected, and whether oscillation of the power supply system exceeds a preset threshold range is detected. In this way, when it is detected that the oscillation of the power supply system exceeds the preset threshold range, a power compensation control proportion of each distributed generation is adjusted based on impedance from each distributed generation to the point of common coupling of the power supply system, so that a power output proportion of each distributed generation is controlled based on an adjusted power compensation control proportion. In this way, the oscillation of the power supply system is suppressed, and normal and stable operation of the power supply system is ensured. In addition, low implementation complexity and low implementation costs can be achieved without changing an original control circuit or adding an additional device.

BRIEF DESCRIPTION OF DRAWINGS

To describe technical solutions in embodiments of this application or in the background more clearly, the following describes the accompanying drawings for describing embodiments of this application or the background.

DESCRIPTION OF EMBODIMENTS

The following describes embodiments of this application with reference to the accompanying drawings in embodiments of this application.

The power supply system provided in this application may be applicable to a new energy station. Based on different types of new energy stations, the application fields may be classified into a plurality of application fields such as a new energy smart microgrid field, a power transmission and distribution field, a new energy field (for example, a photovoltaic grid connection field or a wind power grid connection field), a photovoltaic storage power generation field (for example, supplying power to a household device (for example, a refrigerator or an air conditioner) or a power grid), a wind storage power generation field, or a high-power converter field (for example, converting a direct current into a high-power high-voltage alternating current). This may be specifically determined based on an actual application scenario, and is not limited herein. The power supply system provided in this application may be applied to different application scenarios, for example, an application scenario of photovoltaic storage power supply, an application scenario of wind storage power supply, an application scenario of pure energy storage power supply, or another application scenario. The following uses the application scenario of energy storage power supply as an example for description. Details are not described below again.

Figure 1:
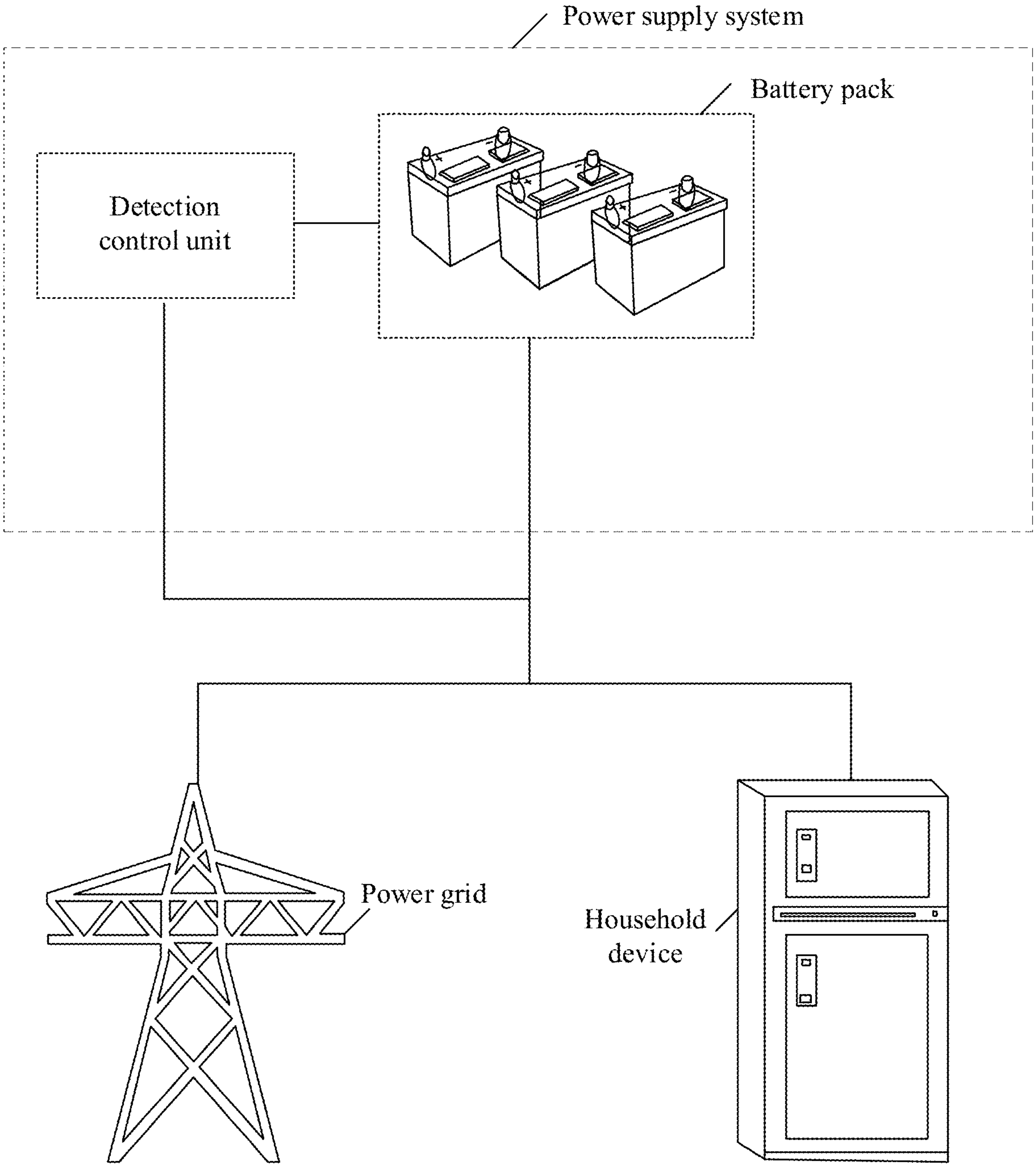
FIG. 1 is a schematic of an application scenario of a power supply system according to this application.

FIG. 1 is a schematic of an application scenario of a power supply system according to this application. In an application scenario of pure energy storage power supply, as shown in FIG. 1, the power supply system includes a battery pack and a detection control unit. In a process in which the battery pack supplies power to a load, the detection control unit may detect a voltage and a current of a point of common coupling of the power supply system, and control, based on the detected voltage and current, the battery pack to supply power to the load such as a communication base station or a household device in a power grid. The detection control unit may be a new energy station controller, including a new energy power generation station controller, an energy storage station controller, a microelectric controller, an active power distribution network controller, or the like.

Figure 2:
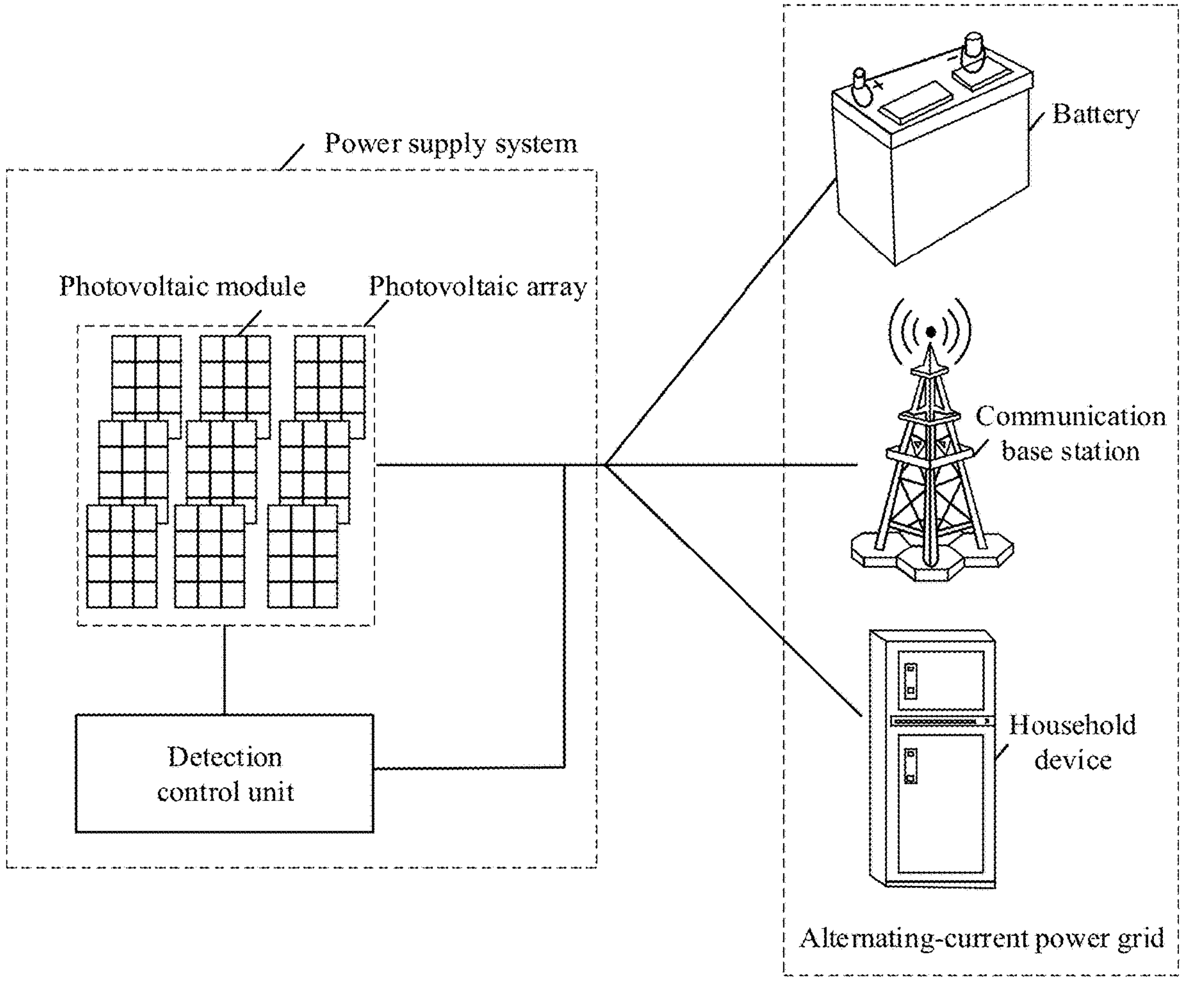
FIG. 2 is a schematic of another application scenario of a power supply system according to this application.

FIG. 2 is a schematic of another application scenario of a power supply system according to this application. In an application scenario of a photovoltaic system, an output end of a photovoltaic array may be connected to a power grid. A detection control unit may detect a voltage and a current of a point of common coupling of the power supply system, and control, based on the detected voltage and current, the photovoltaic array to supply power to an electric device such as a battery, a communication base station, or a household device in the power grid. In the photovoltaic system shown in FIG. 2, the photovoltaic array may be a photovoltaic module group. One photovoltaic module group may include one or more photovoltaic strings connected in parallel, and one photovoltaic string may be obtained by connecting one or more photovoltaic modules in series. The photovoltaic module herein may be a solar panel, a photovoltaic panel, or an energy storage battery. In other words, in the photovoltaic system shown in FIG. 2, one photovoltaic string may be one photovoltaic string obtained by connecting one or more solar panels, one or more photovoltaic panels, or one or more energy storage batteries in series, and output currents of a plurality of photovoltaic strings are used by the electric device such as the battery, the communication base station, or the household device in the power grid.

Figure 3:
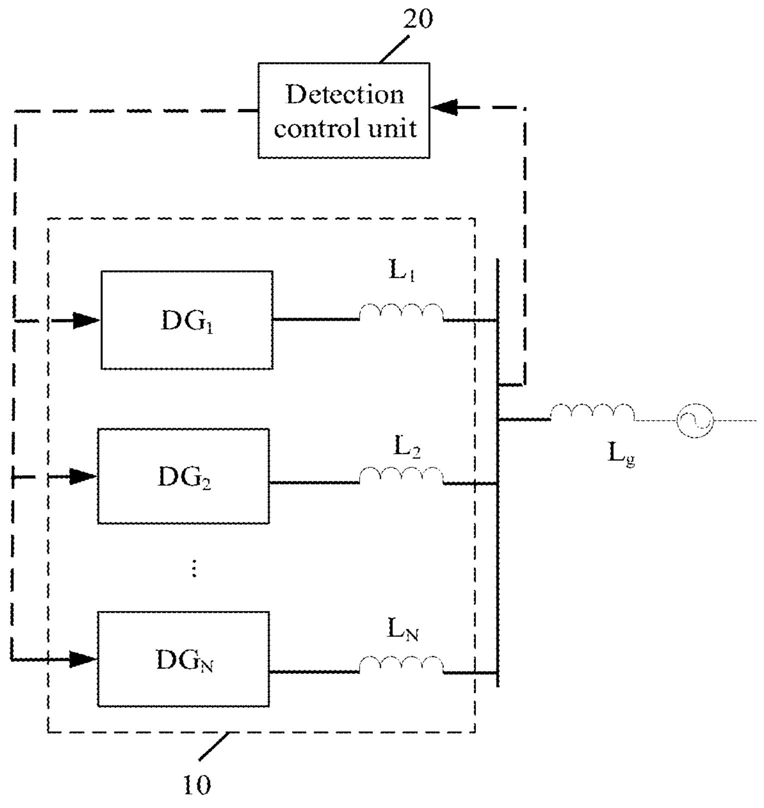
FIG. 3 is a schematic of a structure of a radiation wiring manner of a power supply system according to this application.
Figure 4:
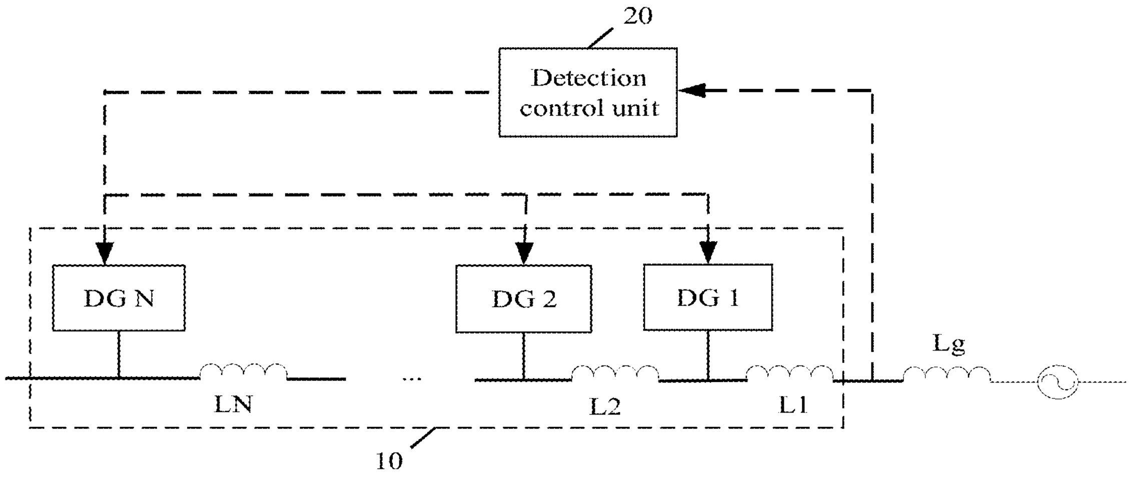
FIG. 4 is a schematic of a structure of a T-shaped wiring manner of a power supply system according to this application.

With reference to FIG. 3 and FIG. 4, the following describes, by using an example, a power supply system provided in this application and an operation principle of the power supply system. In embodiments of this application, "and/or" indicates one, or may indicate some or all. For example, a $DG_1$, a $DG_2$, and/or a $DG_3$ may indicate any one of the $DG_1$, the $DG_2$, and the $DG_3$, or may indicate any two of the $DG_1$, the $DG_2$, and the $DG_3$, or may indicate the $DG_1$, the $DG_2$, and the $DG_3$.

Wiring manners of distributed generations (DGs) in the power supply system may be classified into a radiation wiring manner and a T-shaped wiring manner. As shown in FIG. 3, FIG. 3 is a schematic of a structure of the radiation wiring manner of the power supply system according to this application. The power supply system includes N DGs ($DG_1$, $DG_2$, . . . , and $DG_N$) 10 and at least one detection control unit 20. N DGs are connected in parallel and then connected to a power grid. One detection control unit 20 is used as an example. One end of the detection control unit 20 is connected to a point of common coupling of the power supply system, and the other end of the detection control unit 20 is connected to a control end of each DG. Impedance exists between each DG and the point of common coupling of the power supply system. Impedance from the $DG_1$ to the point of common coupling is $L_1$, impedance from the $DG_2$ to the point of common coupling is $L_2$, . . . , and impedance from the $DG_N$ to the point of common coupling is $L_N$. N is an integer greater than or equal to 1.

As shown in FIG. 4, FIG. 4 is a schematic of a structure of the T-shaped wiring manner of the power supply system according to this application. The power supply system includes N DGs ($DG_1$, $DG_2$, . . . , and $DG_N$) 10 and at least one detection control unit 20. Impedance exists between every two adjacent DGs. Impedance between the $DG_1$ and a point of common coupling is $L_1$, impedance between the $DG_1$ and the $DG_2$ is $L_2$, . . . , and impedance between the $DG_N$ and the $DG_{N-1}$ is $L_N$. $L_1$ and the $DG_1$ may form a DG unit 1, $L_2$ and the $DG_2$ may form a DG unit 2, . . . , and $L_N$ and the $DG_N$ may form a DG unit N. N DG units are connected in series and then connected to a power grid. One detection control unit 20 is used as an example. One end of the detection control unit 20 is connected to the point of common coupling of the power supply system, and the other end of the detection control unit 20 is connected to a control end of each DG. The impedance may include resistance, inductive reactance, and capacitive reactance, and has obstruction effect on an alternating current.

The detection control unit 20 may include a plurality of logic components, for example, a proportional integral controller, a second-order general integrator phase-locked loop (SOGI-PLL), a threshold comparator, a high-frequency filter, a compensator, a root mean square (RMS) detector, and an equalization control loop regulator. The detection control unit is configured to: detect a voltage and a current of the point of common coupling of the power supply system, and control, based on the detected voltage and current, each DG to output active power and reactive power to the power grid.

The detection control unit 20 is configured to obtain a power compensation control proportion $$\frac{1}{N}$$

of each distributed generation when it is detected that the power supply system operates normally and stably. The power compensation control proportion is a proportion of power output by each distributed generation to total power output by the power supply system. Power output proportion of each distributed generation is controlled based on the power compensation control proportion $$\frac{1}{N}.$$

Each distributed generation is controlled, in a state of charge (SOC) equalization control manner, to output active power and reactive power, so that an SOC of each distributed generation is maintained at an average value of SOCs of the N distributed generations. That the system operates normally and stably may indicate that the power supply system does not oscillate, or that oscillation of the power supply system does not exceed a preset threshold range. Specific implementations are as follows.

In a possible implementation, the detection control unit 20 is further configured to: when it is detected that the system operates normally and stably, obtain an active power compensation control proportion $$\frac{1}{N}$$

of each distributed generation, and control each distributed generation to output active power $$P_{ref(k)} = P_{all}\frac{1}{N} + (SOC_{ave} - SOC_k)G_{pi\_soc}.$$

$P_{ref(k)}$ is active power output by a distributed generation numbered k in the N distributed generations, $P_{all}$ is total active power output by the power supply system, $SOC_{ave}$ is the average value of the SOCs of the N distributed generations, $SOC_k$ is an SOC of the distributed generation numbered k, $G_{pi\_soc}$ is a transfer function, and the transfer function may be a transfer function of the equalization control loop regulator.

In another possible implementation, the detection control unit 20 is further configured to: when it is detected that the system operates normally and stably, obtain a reactive power compensation control proportion $$\frac{1}{N}$$

of each distributed generation, and control each distributed generation to output reactive power $$Q_{ref(k)} = Q_{all}\frac{1}{N}.$$

$Q_{ref(k)}$ is reactive power output by a distributed generation numbered k in the N distributed generations, and $Q_{all}$ is total reactive power output by the power supply system.

In addition, the detection control unit 20 is configured to: when it is detected that the oscillation of the power supply system exceeds the preset threshold range, obtain a power compensation control proportion of each distributed generation based on the impedance from each distributed generation to the point of common coupling of the power supply system. The power compensation control proportion is a proportion of power output by each distributed generation to total power output by the power supply system. As shown in FIG. 3, the impedance from the $DG_1$ to the point of common coupling is $L_1$, the impedance from the $DG_2$ to the point of common coupling is $L_2$, . . . , and the impedance from the $DG_N$ to the point of common coupling is $L_N$. As shown in FIG. 4, the impedance from the $DG_1$ to the point of common coupling is $L_1$, impedance from the $DG_2$ to the point of common coupling is $L_1+L_2$, . . . , and impedance from the $DG_N$ to the point of common coupling is $L_1+L_2+ \ldots +L_N$. Because impedance from the N DGs to the point of common coupling is different, power compensation control proportions of the N DGs are also different. The detection control unit 20 is further configured to control a power output proportion of each distributed generation based on the power compensation control proportion, to suppress the oscillation of the power supply system, and ensure that the power supply system resumes normal and stable operation. In addition, low implementation complexity and low implementation costs can be achieved without changing an original control circuit or adding an additional device. Specific implementations are as follows.

In a possible implementation, the detection control unit 20 is further configured to: when impedance from a first distributed generation in the N distributed generations to the point of common coupling is greater than a first threshold, control active power output by the first distributed generation to be less than first preset power; or when impedance from a first distributed generation to the point of common coupling is less than or equal to a first threshold, control active power output by the first distributed generation to be greater than or equal to first preset power. The first distributed generation is any one of the N distributed generations. That is, larger impedance from any one of the N distributed generations to the point of common coupling indicates lower active power output by the distributed generation, and smaller impedance from any one of the N distributed generations to the point of common coupling indicates higher active power output by the distributed generation. Active power output by each distributed generation is adjusted, so that the oscillation of the power supply system is suppressed, and the power supply system is ensured to resume the normal and stable operation.

In another possible implementation, the detection control unit 20 is further configured to: when impedance from a second distributed generation in the N distributed generations to the point of common coupling is greater than a second threshold, control reactive power output by the second distributed generation to be greater than second preset power; or when impedance from a second distributed generation to the point of common coupling is less than or equal to a second threshold, control reactive power output by the second distributed generation to be less than or equal to second preset power. The second distributed generation is any one of the N distributed generations. That is, larger impedance from any one of the N distributed generations to the point of common coupling indicates higher reactive power output by the distributed generation, and smaller impedance from any one of the N distributed generations to the point of common coupling indicates lower reactive power output by the distributed generation. Reactive power output by the distributed generation is adjusted, so that the oscillation of the power supply system is suppressed, and the power supply system is ensured to resume the normal and stable operation.

In another possible implementation, the detection control unit 20 is further configured to: when it is detected that the oscillation of the power supply system exceeds the preset threshold range, control a sum of active power output by the N distributed generations to be equal to total active power output by the power supply system before the oscillation of the power supply system exceeds the preset threshold range; and control a sum of reactive power output by the N distributed generations to be equal to total reactive power output by the power supply system before the oscillation of the power supply system exceeds the preset threshold range. That is, on the premise that the total active power and the total reactive power that are output by the power supply system are not changed, the active power and the reactive power that are output by each distributed generation are adjusted, so that the oscillation of the power supply system is suppressed, and the power supply system is ensured to resume the normal and stable operation.

In another possible implementation, the power compensation control proportion includes an active power compensation control proportion, and the active power compensation control proportion is a proportion of the active power output by each distributed generation to the total active power output by the power supply system. The detection control unit 20 is further configured to: when it is detected that the oscillation of the power supply system exceeds the preset threshold range, number each distributed generation in ascending order of impedance from distributed generations to the point of common coupling, obtain the active power compensation control proportion of each distributed generation based on a number of each distributed generation and N, and control, based on the active power compensation control proportion, each distributed generation to output the active power.

For example, as shown in FIG. 3, the impedance from the $DG_1$ to the point of common coupling is $L_1$, the impedance from the $DG_2$ to the point of common coupling is $L_2$, . . . , and the impedance from the $DG_N$ to the point of common coupling is $L_N$, where $L_1<L_2<L_3<\ldots<L_N$. Therefore, the N DGs are numbered sequentially in ascending order of impedance from the DGs to the point of common coupling. A number of the $DG_1$ is 1, a number of the $DG_2$ is 2, . . . , and a number of the $DG_N$ is N. As shown in FIG. 4, the impedance from the $DG_1$ to the point of common coupling is $L_1$, the impedance from the $DG_2$ to the point of common coupling is $L_1+L_2$, . . . , and the impedance from the $DG_N$ to the point of common coupling is $L_1+L_2+\ldots+L_N$, where $L_1<L_1+L_2<L_1+L_2+L_3<\ldots<L_1+L_2+L_3+\ldots+L_N$. Therefore, the N DGs are numbered sequentially in ascending order of impedance from the DGs to the point of common coupling. A number of the $DG_1$ is 1, a number of the $DG_2$ is 2, . . . , and a number of the $DG_N$ is N.

An active power compensation control proportion $\varepsilon_{p(k)}$ of a distributed generation numbered k in the N distributed generations satisfies:

$$\varepsilon_{p(k)} = \frac{1}{N} - \left(k - \frac{N}{2}\right)G_{reg\_p};$$

and active power $P_{ref(k)}$ output by the distributed generation numbered k in the N distributed generations satisfies:

$$P_{ref(k)} = P_{all}\varepsilon_{p(k)} + (SOC_{ave} - SOC_k)G_{pi\_soc}$$

Herein, k is an integer greater than or equal to 1 and less than or equal to N, $$G_{reg\_p} = K_{p\_p} + \frac{K_{p\_i}}{s},$$

$K_{p\_p}$ is a first proportional coefficient, $K_{p\_i}$ is a first integral coefficient, s is a Laplace operator, $P_{all}$ is the total active power output by the power supply system, $SOC_{ave}$ is an average value of SOCs of the N distributed generations, $SOC_k$ is an SOC of the distributed generation numbered k, and $G_{pi\_soc}$ IS a transfer function. The first proportional coefficient may be a proportional coefficient of the proportional integral controller, the first integral coefficient may be an integral coefficient of the proportional integral controller, and the transfer function is a transfer function of the equalization control loop regulator.

In another possible implementation, the power compensation control proportion includes a reactive power compensation control proportion, and the reactive power compensation control proportion is a proportion of the reactive power output by each distributed generation to the total reactive power output by the power supply system. The detection control unit 20 is further configured to: when it is detected that the oscillation of the power supply system exceeds the preset threshold range, number each distributed generation in ascending order of impedance from the distributed generations to the point of common coupling, obtain the reactive power compensation control proportion of each distributed generation based on a number of each distributed generation and N, and control, based on the reactive power compensation control proportion, each distributed generation to output the reactive power.

For example, as shown in FIG. 3, the impedance from the $DG_1$ to the point of common coupling is $L_1$, the impedance from the $DG_2$ to the point of common coupling is $L_2$, . . . , and the impedance from the $DG_N$ to the point of common coupling is $L_N$, where $L_1<L_2<L_3<\ldots<L_N$. Therefore, the N DGs are numbered sequentially in ascending order of impedance from the DGs to the point of common coupling.

A number of the $DG_1$ is 1, a number of the $DG_2$ is 2, . . . , and a number of the $DG_N$ is N. As shown in FIG. 4, the impedance from the $DG_1$ to the point of common coupling is $L_1$, the impedance from the $DG_2$ to the point of common coupling is $L_1+L_2$, . . . , and the impedance from the $DG_N$ to the point of common coupling is $L_1+L_2+ \ldots +L_N$, where $L_1<L_1+L_2<L_1+L_2+L_3< \ldots <L_1+L_2+L_3+ \ldots +L_N$. Therefore, the N DGs are numbered sequentially in ascending order of impedance from the DGs to the point of common coupling. A number of the $DG_1$ is 1, a number of the $DG_2$ is 2, . . . , and a number of the $DG_N$ is N.

A reactive power compensation control proportion $\varepsilon_{q(k)}$ of a distributed generation numbered k in the N distributed generations satisfies:

$$\varepsilon_{q(k)} = \frac{1}{N} + \left(k - \frac{N}{2}\right)G_{reg\_q};$$

and reactive power $Q_{ref(k)}$ output by the distributed generation numbered k in the N distributed generations satisfies:

$$Q_{ref(k)}Q_{all}\varepsilon_{q(k)}$$

Herein, k is an integer greater than or equal to 1 and less than or equal to N, N is a total quantity of distributed generations, $$G_{reg\_q} = K_{q\_p} + \frac{K_{q\_i}}{s},$$

$K_{q\_p}$ is a second proportional coefficient, $K_{q\_i}$ is a second integral coefficient, s is a Laplace operator, and Q au is the total reactive power output by the power supply system. The second proportional coefficient may be a proportional coefficient of the proportional integral controller, and the second integral coefficient may be an integral coefficient of the proportional integral controller.

In conclusion, a distributed generation is numbered in the ascending order of the impedance from the distributed generations to the point of common coupling. Smaller impedance from the distributed generation to the point of common coupling indicates a smaller number of the distributed generation, a larger active power compensation control proportion $\varepsilon_{p(k)}$, and a smaller reactive power compensation control proportion $\varepsilon_{q(k)}$. Therefore, higher active power output by the distributed generation indicates lower reactive power output by the distributed generation. Alternatively, larger impedance from the distributed generation to the point of common coupling indicates a larger number of the distributed generation, a smaller active power compensation control proportion $\varepsilon_{p(k)}$, and a larger reactive power compensation control proportion $\varepsilon_{q(k)}$. Therefore, lower active power output by the distributed generation indicates higher reactive power output by the distributed generation. The active power and the reactive power that are output by each distributed generation are dynamically adjusted, so that the oscillation of the power supply system is suppressed, and the power supply system is ensured to resume the normal and stable operation.

Certainly, in this embodiment of this application, a distributed generation may alternatively be numbered in descending order of the impedance from the distributed generation to the point of common coupling. Smaller impedance from the distributed generation to the point of common coupling indicates a larger number of the distributed generation, a larger active power compensation control proportion $\varepsilon_{p(k)}$, and a smaller reactive power compensation control proportion $\varepsilon_{q(k)}$. Therefore, higher active power output by the distributed generation indicates lower reactive power output by the distributed generation. Larger impedance from the distributed generation to the point of common coupling indicates a larger number of the distributed generation, a smaller active power compensation control proportion $\varepsilon_{p(k)}$, and a larger reactive power compensation control proportion $\varepsilon_{q(k)}$. Therefore, lower active power output by the distributed generation indicates higher reactive power output by the distributed generation.

It should be noted that formulas for calculating the active power compensation control proportion $\varepsilon_{p(k)}$ and the reactive power compensation control proportion $\varepsilon_{q(k)}$ are not limited to the foregoing formulas. A formula that satisfies a case in which larger impedance from a distributed generation to the point of common coupling indicates a smaller active power compensation control proportion $\varepsilon_{p(k)}$ and a larger reactive power compensation control proportion $\varepsilon_{p(k)}$, or a formula that satisfies a case in which smaller impedance from a distributed generation to the point of common coupling indicates a larger active power compensation control proportion $\varepsilon_{p(k)}$ and a smaller reactive power compensation control proportion $\varepsilon_{p(k)}$ all falls within the protection scope of this application.

In another possible implementation, the detection control unit 20 is further configured to: collect the current and the voltage of the point of common coupling of the power supply system, and obtain an effective value of an oscillation component of the voltage, an effective value of an oscillation component of the current, and an effective value of an oscillation component of a system frequency based on the voltage and the current of the point of common coupling; and when the effective value of the oscillation component of the voltage is greater than a third threshold, the effective value of the oscillation component of the current is greater than a fourth threshold, and/or the effective value of the oscillation component of the system frequency is greater than a fifth threshold, learn that the oscillation of the power supply system exceeds the preset threshold range. When the effective value of the oscillation component of the voltage is not greater than a third threshold, the effective value of the oscillation component of the current is not greater than a fourth threshold, and the effective value of the oscillation component of the system frequency is not greater than a fifth threshold, it is learned that the power supply system operates normally and stably. The effective value of the oscillation component of the voltage may be an RMS value of the oscillation component of the voltage, the effective value of the oscillation component of the current may be an RMS value of the oscillation component of the current, and the effective value of the oscillation component of the system frequency may be an RMS value of the oscillation component of the system frequency.

For example, the detection control unit 20 may collect a voltage $V_{pcc}$ and a current $I_{pcc}$ of the point of common coupling, extract a phase $\theta_g$ of the voltage $V_{pcc}$, calculate a system frequency $\omega_g$ and generate a dq rotating coordinate system, calculate a $V_{pcc}$ component and an $I_{pcc}$ component in the rotating coordinate system through Park transformation, separately perform squaring and root extraction on the $V_{pcc}$ component and the $I_{pcc}$ component, to obtain a voltage amplitude $E_m$ and a current amplitude $I_m$, then separately process the phase $\theta_g$, the voltage amplitude $E_m$, and the current amplitude $I_m$ by using a high-pass filter to obtain an oscillation component of the voltage, an oscillation component of the current, and an oscillation component of the system frequency, and separately calculate an RMS value of the oscillation component of the voltage, an RMS value of the oscillation component of the current, and an RMS value of the oscillation component of the system frequency that are respectively denoted as $E_{m,ripple}$, $I_{m,ripple}$, and $\omega_{g,ripple}$. $E_{m,ripple}$ corresponds to a threshold $E_{m,ripple}$ threshold, $I_{m,ripple}$ corresponds to a threshold $I_{m,ripple\_threshold}$, and $\omega_{g,ripple}$ corresponds to a threshold $\omega_{g,ripple\_threshold}$. $E_{m,ripple}$, $I_{m,ripple}$, and $\omega_{g,ripple}$ are respectively compared with corresponding thresholds. When any one of $E_{m,ripple}$, $I_{m,ripple}$, and $\omega_{g,ripple}$ exceeds the corresponding threshold, it is determined that the oscillation of the power supply system exceeds the preset threshold range. When none of $E_{m,ripple}$, $I_{m,ripple}$, and $\omega_{g,ripple}$ exceeds the corresponding threshold, it is determined that the power supply system operates normally and stably. When it is determined that the oscillation of the power supply system exceeds the preset threshold range, the threshold comparator may output $Flag_{emg}=1$, adjust a power compensation control proportion of each distributed generation based on the impedance from each distributed generation to the point of common coupling of the power supply system, and control, based on the adjusted power compensation control proportion, the distributed generation to output the active power and the reactive power. When the power supply system operates normally and stably, the threshold comparator may output $Flag_{emg}=0$, and control, in an SOC equalization control manner, each distributed generation to output active power and reactive power.

It should be noted that, after the active power and the reactive power that are output by each distributed generation are adjusted, to suppress the oscillation of the power supply system, and ensure that the power supply system resumes the normal and stable operation, an integrator of the compensator in the detection control unit 20 may be cleared, to ensure that when it is detected that oscillation of the power supply system exceeds the preset threshold range next time, the compensator may keep starting slowly, thereby implementing continuous power control.

Figure 5:
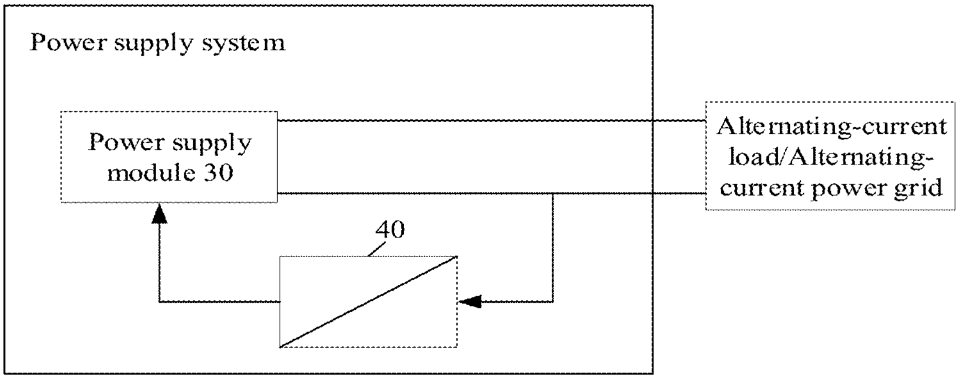
FIG. 5 is a schematic of a structure of a power supply system according to this application.

Refer to FIG. 5. FIG. 5 is a schematic of a structure of a power supply system according to this application. As shown in FIG. 5, the power supply system includes a power supply module 30 and a detection control unit 40. The power supply module 30 may include N distributed generations, and an input end of the detection control unit 40 may be connected to a point of common coupling of the power supply module 30. In an application scenario of pure energy storage power supply, the power supply module 30 may include a plurality of battery packs connected in series and in parallel, and one battery pack may include one or more battery units (a voltage of the battery unit is usually between 2.5 V and 4.2 V) connected in series and in parallel, to form a minimum energy storage and management unit. Optionally, the power supply module may alternatively be a power generation component, and the power generation component may include but is not limited to a solar power generation component, a wind power generation component, a hydrogen power generation component, and a diesel generator power generation component. In a photovoltaic storage hybrid power supply scenario, the power supply module 30 is a photovoltaic array. The photovoltaic array may include a plurality of photovoltaic strings connected in series and in parallel, and one photovoltaic string may include a plurality of photovoltaic modules (which may also be referred to as solar panels or photovoltaic panels). The detection control unit 40 may detect a current and a voltage of the point of common coupling of the power supply module 30, and determine, based on the detected current and voltage of the point of common coupling of the power supply module 30, whether oscillation of the power supply system exceeds a preset threshold range. When it is detected that the oscillation of the power supply system exceeds the preset threshold range, a power compensation control proportion of each distributed generation is obtained based on impedance from each distributed generation to the point of common coupling of the power supply system, and a power output proportion of each distributed generation is controlled based on the power compensation control proportion. In this way, the oscillation of the power supply system is suppressed, and the power supply system is ensured to resume normal and stable operation.

Figure 6:
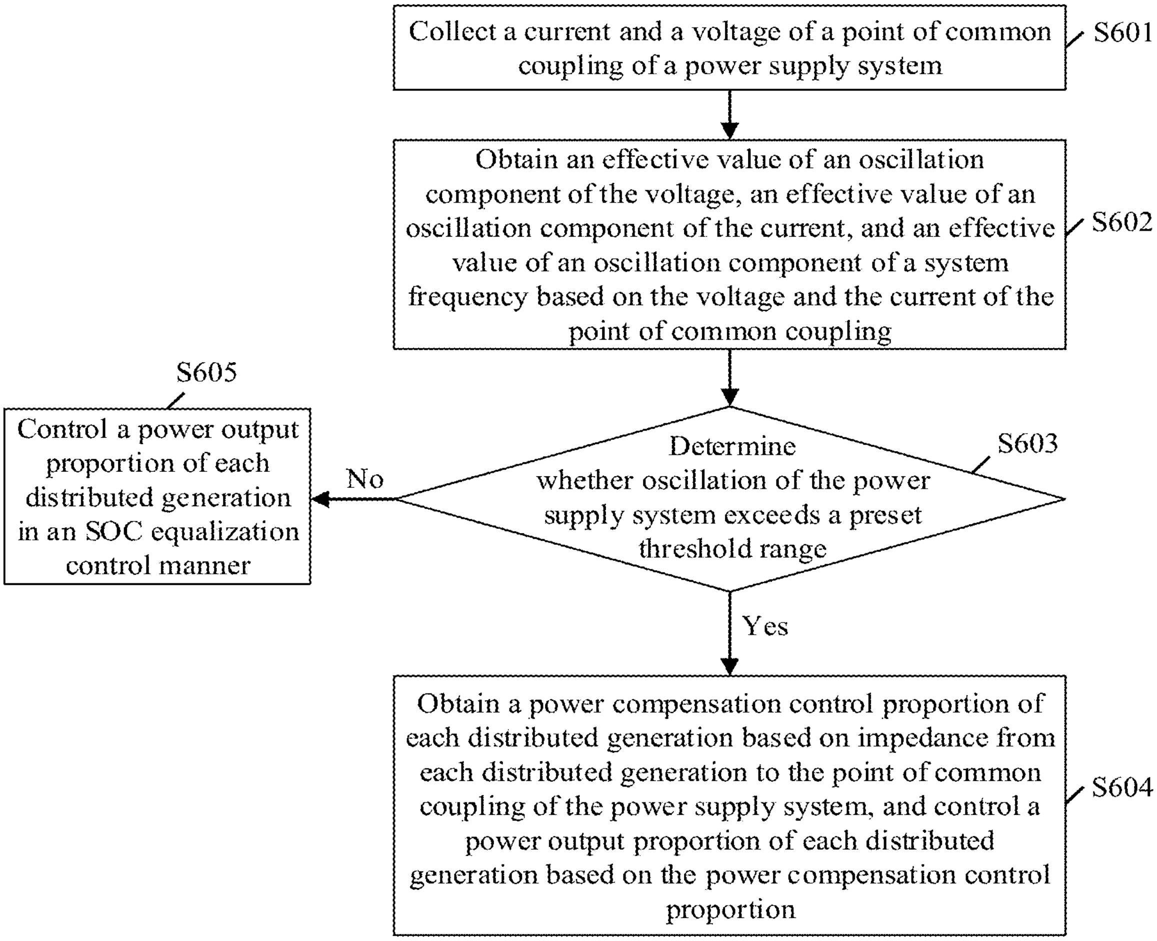
FIG. 6 is a schematic flowchart of a power control method for a power supply system according to this application.

As shown in FIG. 6, FIG. 6 is a schematic flowchart of a power control method for a power supply system according to this application. The method is applicable to at least one detection control unit in the power supply system, the power supply system further includes N distributed generations, the N distributed generations are connected in parallel or in series and then connected to a power grid, and N is an integer greater than 1.

S601: Collect a current and a voltage of a point of common coupling of the power supply system.

In a possible implementation, the current and the voltage of the point of common coupling of the power supply system may be collected in real time.

In another possible implementation, the current and the voltage of the point of common coupling of the power supply system may alternatively be collected based on a preset sampling period.

In another possible implementation, an input instruction of a user may be received, and the current and the voltage of the point of common coupling of the power supply system are collected based on the input instruction.

S602: Obtain an effective value of an oscillation component of the voltage, an effective value of an oscillation component of the current, and an effective value of an oscillation component of a system frequency based on the voltage and the current of the point of common coupling.

Specifically, a voltage $V_{pcc}$ and a current $I_{pcc}$ of the point of common coupling may be collected, a phase $\theta_g$ of the voltage $V_{pcc}$ may be extracted, a system frequency $\omega_g$ may be calculated and a dq rotating coordinate system may be generated, a $V_{pcc}$ component and an $I_{pcc}$ component in the rotating coordinate system may be calculated through Park transformation, and squaring and root extraction are separately performed on the $V_{pcc}$ component and the $I_{pcc}$ component, to obtain a voltage amplitude $E_m$ and a current amplitude $I_m$. Then, the phase $\theta_g$, the voltage amplitude $E_m$, and the current amplitude $I_m$ are separately processed by using a high-pass filter, to obtain an oscillation component of the voltage, an oscillation component of the current, and an oscillation component of the system frequency, and an RMS value of the oscillation component of the voltage, an RMS value of the oscillation component of the current, and an RMS value of the oscillation component of the system frequency are separately calculated and are respectively denoted as $E_{m,ripple}$, $I_{m,ripple}$, and $\omega_{g,ripple}$. The effective value of the oscillation component of the voltage may be the RMS value of the oscillation component of the voltage, the effective value of the oscillation component of the current may be the RMS value of the oscillation component of the current, and the effective value of the oscillation component of the system frequency may be the RMS value of the oscillation component of the system frequency.

S603: Determine whether oscillation of the power supply system exceeds a preset threshold range. If the oscillation of the power supply system exceeds the preset threshold range, S604 is performed. If the power supply system operates normally and stably, S605 is performed.

Specifically, when the effective value of the oscillation component of the voltage is greater than a third threshold, the effective value of the oscillation component of the current is greater than a fourth threshold, and/or the effective value of the oscillation component of the system frequency is greater than a fifth threshold, it is learned that the oscillation of the power supply system exceeds the preset threshold range. When the effective value of the oscillation component of the voltage is not greater than a third threshold, the effective value of the oscillation component of the current is not greater than a fourth threshold, and the effective value of the oscillation component of the system frequency is not greater than a fifth threshold, it is learned that the power supply system operates normally and stably.

For example, $E_{m,ripple}$ corresponds to a threshold $E_{m,ripple\_threshold}$, $I_{m,ripple}$ corresponds to a threshold $I_{m,ripple\_threshold}$, and $\omega_{g,ripple}$ corresponds to a threshold $\omega_{g,ripple\_threshold}$. $E_{m,ripple}$, $I_{m,ripple}$, and $\omega_{g,ripple}$ are respectively compared with corresponding thresholds. When any one of $E_{m,ripple}$, $I_{m,ripple}$, and $\omega_{g,ripple}$ exceeds the corresponding threshold, it is determined that the oscillation of the power supply system exceeds the preset threshold range. When none of $E_{m,ripple}$, $I_{m,ripple}$, and ωg,ripple exceeds the corresponding threshold, it is determined that the power supply system operates normally and stably.

S604: Obtain a power compensation control proportion of each distributed generation based on impedance from each distributed generation to the point of common coupling of the power supply system, and control a power output proportion of each distributed generation based on the power compensation control proportion.

In a possible implementation, when impedance from a first distributed generation in the N distributed generations to the point of common coupling is greater than a first threshold, active power output by the first distributed generation is controlled to be less than first preset power. Alternatively, when impedance from a first distributed generation to the point of common coupling is less than or equal to a first threshold, active power output by the first distributed generation is controlled to be greater than or equal to first preset power. The first distributed generation is any one of the N distributed generations. That is, larger impedance from any one of the N distributed generations to the point of common coupling indicates lower active power output by the distributed generation, and smaller impedance from any one of the N distributed generations to the point of common coupling indicates higher active power output by the distributed generation. Active power output by each distributed generation is adjusted, so that the oscillation of the power supply system is suppressed, and the power supply system is ensured to resume normal and stable operation.

In another possible implementation, when impedance from a second distributed generation in the N distributed generations to the point of common coupling is greater than a second threshold, reactive power output by the second distributed generation is controlled to be greater than second preset power. Alternatively, when impedance from a second distributed generation to the point of common coupling is less than or equal to a second threshold, reactive power output by the second distributed generation is controlled to be less than or equal to second preset power. The second distributed generation is any one of the N distributed generations. That is, larger impedance from any one of the N distributed generations to the point of common coupling indicates higher reactive power output by the distributed generation, and smaller impedance from any one of the N distributed generations to the point of common coupling indicates lower reactive power output by the distributed generation. Reactive power output by the distributed generation is adjusted, so that the oscillation of the power supply system is suppressed, and the power supply system is ensured to resume normal and stable operation.

In another possible implementation, when it is detected that the oscillation of the power supply system exceeds the preset threshold range, a sum of active power output by the N distributed generations is controlled to be equal to total active power output by the power supply system before the oscillation of the power supply system exceeds the preset threshold range, and a sum of reactive power output by the N distributed generations is controlled to be equal to total reactive power output by the power supply system before the oscillation of the power supply system exceeds the preset threshold range. That is, on the premise that the total active power and the total reactive power that are output by the power supply system are not changed, the active power and the reactive power that are output by each distributed generation are adjusted, so that the oscillation of the power supply system is suppressed, and the power supply system is ensured to resume the normal and stable operation.

In another possible implementation, the power compensation control proportion includes an active power compensation control proportion, and the active power compensation control proportion is a proportion of the active power output by each distributed generation to the total active power output by the power supply system. When it is detected that the oscillation of the power supply system exceeds the preset threshold range, each distributed generation is numbered in ascending order of impedance from the distributed generations to the point of common coupling, the active power compensation control proportion of each distributed generation is obtained based on a number of each distributed generation and N, and each distributed generation is controlled, based on the active power compensation control proportion, to output the active power.

For example, as shown in FIG. 3, the impedance from the $DG_1$ to the point of common coupling is $L_1$, the impedance from the $DG_2$ to the point of common coupling is $L_2$, . . . , and the impedance from the $DG_N$ to the point of common coupling is $L_N$, where $L_1<L_2<L_3< \ldots <L_N$. Therefore, the N DGs are numbered sequentially in ascending order of impedance from the DGs to the point of common coupling. A number of the $DG_1$ is 1, a number of the $DG_2$ is 2, . . . , and a number of the $DG_N$ is N. As shown in FIG. 4, the impedance from the $DG_1$ to the point of common coupling is $L_1$, the impedance from the $DG_2$ to the point of common coupling is $L_1+L_2$, . . . , and the impedance from the $DG_N$ to the point of common coupling is $L_1+L_2+ \ldots +L_N$, where $L_1<L_1+L_2<L_1+L_2+L_3< \ldots <L_1+L_2+L_3+ \ldots +L_N$. Therefore, the N DGs are numbered sequentially in ascending order of impedance from the DGs to the point of common coupling. A number of the $DG_1$ is 1, a number of the $DG_2$ is 2, . . . , and a number of the $DG_N$ is N.

An active power compensation control proportion $\varepsilon_{p(k)}$ of a distributed generation numbered k in the N distributed generations satisfies:

$$\varepsilon_{p(k)} = \frac{1}{N} - \left(k - \frac{N}{2}\right)G_{reg\_p};$$

active power $P_{ref}(k)$ output by the distributed generation numbered k in the N distributed generations satisfies:

$$P_{ref(k)} = P_{all}\varepsilon_{p(k)} + (SOC_{ave} - SOC_k)G_{pi\_soc}$$

Herein, k is an integer greater than or equal to 1 and less than or equal to N, $$G_{reg\_p} = K_{p\_p} + \frac{K_{p\_i}}{s},$$

$K_{p\_p}$ is a first proportional coefficient, $K_{p\_i}$ is a first integral coefficient, s is a Laplace operator, $P_{all}$ is the total active power output by the power supply system, $SOC_{ave}$ is an average value of SOCs of the N distributed generations, SOC; is an SOC of the distributed generation numbered k, and $G_{pi\_soc}$ is a transfer function. The first proportional coefficient may be a proportional coefficient of a proportional integral controller, the first integral coefficient may be an integral coefficient of the proportional integral controller, and the transfer function is a transfer function of an equalization control loop regulator.

In another possible implementation, the power compensation control proportion includes a reactive power compensation control proportion, and the reactive power compensation control proportion is a proportion of the reactive power output by each distributed generation to the total reactive power output by the power supply system. When it is detected that the oscillation of the power supply system exceeds the preset threshold range, each distributed generation is numbered in ascending order of impedance from the distributed generations to the point of common coupling, the reactive power compensation control proportion of each distributed generation is obtained based on a number of each distributed generation and N, and each distributed generation is controlled, based on the reactive power compensation control proportion, to output the reactive power.

For example, as shown in FIG. 3, the impedance from the $DG_1$ to the point of common coupling is $L_1$, the impedance from the $DG_2$ to the point of common coupling is $L_2$, . . . , and the impedance from the $DG_N$ to the point of common coupling is $L_N$, where $L_1<L_2<L_3< \ldots <L_N$. Therefore, the N DGs are numbered sequentially in ascending order of impedance from the DGs to the point of common coupling. A number of the $DG_1$ is 1, a number of the $DG_2$ is 2, . . . , and a number of the $DG_N$ is N. As shown in FIG. 4, the impedance from the $DG_1$ to the point of common coupling is $L_1$, the impedance from the $DG_2$ to the point of common coupling is $L_1+L_2$, . . . , and the impedance from the $DG_N$ to the point of common coupling is $L_1+L_2+ \ldots +L_N$, where $L_1<L_1+L_2<L_1+L_2+L_3< \ldots <L_1+L_2+L_3+ \ldots +L_N$. Therefore, the N DGs are numbered sequentially in ascending order of impedance from the DGs to the point of common coupling. A number of the $DG_1$ is 1, a number of the $DG_2$ is 2, . . . , and a number of the $DG_N$ is N.

A reactive power compensation control proportion $\varepsilon_{q(k)}$ of a distributed generation numbered k in the N distributed generations satisfies:

$$\varepsilon_{q(k)} = \frac{1}{N} + \left(k - \frac{N}{2}\right)G_{reg\_q};$$

and reactive power $Q_{ref(k)}$ output by the distributed generation numbered k in the N distributed generations satisfies:

$$Q_{ref(k)}Q_{all}\varepsilon_{q(k)}$$

Herein, k is an integer greater than or equal to 1 and less than or equal to N, N is a total quantity of distributed generations, $$G_{reg\_q} = K_{q\_p} + \frac{K_{q\_i}}{s},$$

$K_{q\_p}$ is a second proportional coefficient, $K_{q\_i}$ is a second integral coefficient, s is a Laplace operator, and $Q_{all}$ is the total reactive power output by the power supply system. The second proportional coefficient may be a proportional coefficient of a proportional integral controller, and the second integral coefficient may be an integral coefficient of the proportional integral controller.

It should be noted that formulas for calculating the active power compensation control proportion $\varepsilon_{p(k)}$ and the reactive power compensation control proportion $\varepsilon_{q(k)}$ are not limited to the foregoing formulas. A formula that satisfies a case in which larger impedance from a distributed generation to the point of common coupling indicates a smaller active power compensation control proportion $\varepsilon_{p(k)}$ and a larger reactive power compensation control proportion $\varepsilon_{p(k)}$, or a formula that satisfies a case in which smaller impedance from a distributed generation to the point of common coupling indicates a larger active power compensation control proportion $\varepsilon_{p(k)}$ and a smaller reactive power compensation control proportion $\varepsilon_{p(k)}$ all falls within the protection scope of this application.

S605: Control a power output proportion of each distributed generation in an SOC equalization control manner.

Specifically, when it is detected that the power supply system operates normally and stably, a power compensation control proportion $$\frac{1}{N}$$

of each distributed generation is obtained, where the power compensation control proportion is a proportion of power output by each distributed generation to total power output by the power supply system. Each distributed generation is controlled, based on the power compensation control proportion $$\frac{1}{N},$$

to output active power and reactive power. Each distributed generation is controlled, in the SOC equalization control manner, to output the active power and the reactive power, so that an SOC of each distributed generation is maintained at an average value of SOCs of the N distributed generations. That the system operates normally and stably may indicate that the power supply system does not oscillate, or that the oscillation of the power supply system does not exceed the preset threshold range. Specific implementations are as follows.

In a possible implementation, when it is detected that the system operates normally and stably, an active power compensation control proportion $$\frac{1}{N}$$

of each distributed generation is obtained, and each distributed generation is controlled to output active power $$P_{ref(k)} = P_{all}\frac{1}{N} + (SOC_{ave} - SOC_k)G_{pi\_soc}.$$

$P_{ref(k)}$ is active power output by a distributed generation numbered k in the N distributed generations, $P_{all}$ is total active power output by the power supply system, $SOC_{ave}$ is the average value of the SOCs of the N distributed generations, $SOC_k$ is an SOC of the distributed generation numbered k, $G_{pi\_soc}$ is a transfer function, and the transfer function may be a transfer function of an equalization control loop regulator.

In another possible implementation, when it is detected that the system operates normally and stably, a reactive power compensation control proportion $$\frac{1}{N}$$

of each distributed generation is obtained, and each distributed generation is controlled to output reactive power $$Q_{ref(k)} = Q_{all}\frac{1}{N}.$$

$Q_{ref(k)}$ is reactive power output by a distributed generation numbered k in the N distributed generations, and $Q_{all}$ is total reactive power output by the power supply system.

It should be noted that, after each distributed generation is controlled to output the active power and the reactive power, S601 to S605 may continue to be repeatedly performed. Whether the oscillation of the power supply system exceeds the preset threshold range is detected, and each distributed generation is controlled to output active power and reactive power in a different power control manner.

In this embodiment of this application, the current and the voltage of the point of common coupling of the power supply system are detected, to determine whether the oscillation of the power supply system exceeds the preset threshold range. When it is detected that the oscillation of the power supply system exceeds the preset threshold range, the power compensation control proportion of each distributed generation is obtained based on the impedance from each distributed generation to the point of common coupling of the power supply system, and the power output proportion of each distributed generation is controlled based on the power compensation control proportion. In this way, the oscillation of the power supply system is suppressed, and the power supply system is ensured to resume the normal and stable operation.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A power supply system comprising:
N distributed generations connected in parallel or in series and configured to connect to a power grid, wherein N is an integer greater than 1; and
one or more detection controllers configured to:
detect that oscillation of the power supply system exceeds a preset threshold range;
obtain, in response to the oscillation exceeding the preset threshold range, a power compensation control proportion of each of the N distributed generations based on an impedance from each of the N distributed generations to a point of common coupling of a microgrid of the power supply system, wherein the power compensation control proportion is a proportion of power output by each of the N distributed generations to a total power output by the power supply system; and
control a power output proportion of each of the N distributed generations based on the power compensation control proportion.

2. The power supply system of claim 1, wherein the one or more detection controllers is further configured to:
control, when a first impedance from a first distributed generation in the N distributed generations to the point of common coupling is greater than a first threshold, an active power output by the first distributed generation to be less than a first preset power; and
control, when the first impedance is less than or equal to the first threshold, the active power to be greater than or equal to the first preset power.

3. The power supply system of claim 1, wherein the one or more detection controllers is further configured to control, when a second impedance from a second distributed generation in the N distributed generations to the point of common coupling is greater than a second threshold, a reactive power output by the second distributed generation to be greater than a second preset power.

4. The power supply system of claim 3, wherein the one or more detection controllers is further configured to control, when the second impedance is less than or equal to the second threshold, the reactive power to be less than or equal to the second preset power.

5. The power supply system of claim 1, wherein in response to the oscillation exceeding the preset threshold range, the one or more detection controllers is further configured to:
control a first sum of active power output by the N distributed generations to be equal to a total active power output by the power supply system before the oscillation exceeds the preset threshold range; and
control a second sum of reactive power output by the N distributed generations to be equal to a total reactive power output by the power supply system before the oscillation exceeds the preset threshold range.

6. The power supply system of claim 1, wherein the power compensation control proportion comprises an active power compensation control proportion that is a proportion of an active power output by each of the N distributed generations to a total active power output by the power supply system, and wherein in response to the oscillation exceeding the preset threshold range, the one or more detection controllers is further configured to:

number each of the N distributed generations in ascending order of impedance from the N distributed generations to the point of common coupling;

obtain the active power compensation control proportion of each of the N distributed generations based on the number of each of the N distributed generations; and control, based on the active power compensation control proportion, each of the N distributed generations to output the active power.

7. The power supply system of claim 6, wherein an active power compensation control proportion $\varepsilon_{p(k)}$ of a distributed generation numbered k in the N distributed generations satisfies:

$$\varepsilon_{p(k)} = \frac{1}{N} - \left(k - \frac{N}{2}\right)G_{reg\_p},$$

wherein an active power $P_{ref(k)}$ output by the distributed generation numbered k in the N distributed generations satisfies:

$$P_{ref(k)} = P_{all}\varepsilon_{p(k)} + (SOC_{ave} - SOC_k)G_{pi\_soc},$$

wherein k is an integer greater than or equal to 1 and less than or equal to N, wherein $$G_{reg\_p} = K_{p\_p} + \frac{K_{p\_i}}{s},$$

wherein $K_{p\_p}$ is a first proportional coefficient, wherein $K_{p\_i}$ integral coefficient, wherein s is a Laplace operator, wherein $P_{all}$ is the total active power, wherein $SOC_{ave}$ is an average value of states of charge (SOCs) of the N distributed generations, wherein $SOC_k$ is an SOC of the distributed generation numbered k, and wherein $G_{pi\_soc}$ is a transfer function.

8. The power supply system of claim 1, wherein the power compensation control proportion comprises a reactive power compensation control proportion that is a proportion of a reactive power output by each of the N distributed generations to a total reactive power output by the power supply system, and wherein in response to the oscillation exceeding the preset threshold range, the one or more detection controllers is further configured to:

number each of the N distributed generations in ascending order of impedance from the N distributed generations to the point of common coupling;

obtain the reactive power compensation control proportion of each of the N distributed generations based on the number of each of the N distributed generations; and control, based on the reactive power compensation control proportion, each of the N distributed generations to output the reactive power.

9. The power supply system of claim 8, wherein a reactive power compensation control proportion $\varepsilon_{q(k)}$ of a distributed generation numbered k in the N distributed generations satisfies:

$$\varepsilon_{q(k)} = \frac{1}{N} + \left(k - \frac{N}{2}\right)G_{reg\_q},$$

wherein a reactive power $Q_{ref}(k)$ output by the distributed generation numbered k in the N distributed generations satisfies:

$$Q_{ref(k)}Q_{all}\varepsilon_{q(k)},$$

wherein k is an integer greater than or equal to 1 and less than or equal to N, wherein $$G_{reg\_q} = K_{q\_p} + \frac{K_{q\_i}}{s},$$

wherein $K_{q\_p}$ is a second proportional coefficient, wherein $K_{q\_i}$ is a second integral coefficient, wherein s is a Laplace operator, and wherein $Q_{all}$ is the total reactive power.

10. The power supply system of claim 1, wherein the one or more detection controllers is further configured to:

collect a current and a voltage of the point of common coupling of the power supply system;

obtain, based on the voltage and the current, an effective value of a first oscillation component of the voltage, an effective value of a second oscillation component of the current, and an effective value of a third oscillation component of a system frequency of the power supply system; and determine, when at least one of the effective value of the first oscillation component is greater than a third threshold, the effective value of the second oscillation component is greater than a fourth threshold, or the effective value of the third oscillation component is greater than a fifth threshold, that the oscillation of the power supply system exceeds the preset threshold range.

11. A method applicable to one or more detection controllers in a power supply system, wherein the method comprises:

detecting that oscillation of the power supply system exceeds a preset threshold range;

obtaining, in response to the oscillation of the power supply system exceeding the preset threshold range, a power compensation control proportion of each distributed generation based on impedance from each distributed generation of N distributed generations to a point of common coupling of the power supply system, wherein the power compensation control proportion is a proportion of power output by each distributed generation to total power output by the power supply system, wherein the power supply system comprises the N distributed generations, wherein the N distributed generations are connected in parallel or in series and configured to connect to a power grid, and wherein N is greater than 1; and controlling a power output proportion of each distributed generation based on the power compensation control proportion.

12. The method of claim 11, further comprising:

controlling, when a first impedance from a first distributed generation in the N distributed generations to the point of common coupling is greater than a first threshold, an active power output by the first distributed generation to be less than a first preset power; and controlling, when the first impedance is less than or equal to the first threshold, the active power to be greater than or equal to the first preset power.

13. The method of claim 11, further comprising controlling, when a second impedance from a second distributed generation in the N distributed generations to the point of common coupling is greater than a second threshold, a reactive power output by the second distributed generation to be greater than a second preset power.

14. The method of claim 13, further comprising controlling, when the second impedance is less than or equal to the second threshold, the reactive power to be less than or equal to the second preset power.

15. The method of claim 11, wherein in response to the oscillation exceeding the preset threshold range, the method further comprises:

controlling a first sum of active power output by the N distributed generations to be equal to a total active power output by the power supply system before the oscillation exceeds the preset threshold range; and controlling a second sum of reactive power output by the N distributed generations to be equal to a total reactive power output by the power supply system before the oscillation exceeds the preset threshold range.

16. The method of claim 11, wherein the power compensation control proportion comprises an active power compensation control proportion that is a proportion of an active power output by each distributed generation to a total active power output by the power supply system, and wherein in response to the oscillation exceeding the preset threshold range, the method further comprises:

numbering each distributed generation in ascending order of impedance from the N distributed generations to the point of common coupling;

obtaining the active power compensation control proportion of each distributed generation based on the number of each distributed generation; and controlling, based on the active power compensation control proportion, each distributed generation to output the active power.

17. The method of claim 16, wherein an active power compensation control proportion $\varepsilon_{p(k)}$ of a distributed generation numbered k in the N distributed generations satisfies:

$$\varepsilon_{p(k)} = \frac{1}{N} - \left(k - \frac{N}{2}\right)G_{reg\_p},$$

wherein an active power $P_{ref}(k)$ output by the distributed generation numbered k in the N distributed generations satisfies:

$$P_{ref(k)} = P_{all}\varepsilon_{p(k)} + (SOC_{ave} - SOC_k)G_{pi\_soc},$$

wherein k is an integer greater than or equal to 1 and less than or equal to N, wherein $$G_{reg\_p} = K_{p\_p} + \frac{K_{p\_i}}{s},$$

wherein $K_{p\_p}$ is a first proportional coefficient, wherein $K_{p\_i}$ is a first integral coefficient, wherein s is a Laplace operator, wherein $P_{all}$ is the total active power, wherein $SOC_{ave}$ is an average value of states of charge (SOCs) of the N distributed generations, wherein $SOC_k$ is an SOC of the distributed generation numbered k, and wherein $G_{pi\_soc}$ is a transfer function.

18. The method of claim 11, wherein the power compensation control proportion comprises a reactive power compensation control proportion that is a proportion of a reactive power output by each distributed generation to a total reactive power output by the power supply system, and wherein in response to the oscillation exceeding the preset threshold range, the method further comprises:

numbering each distributed generation in ascending order of impedance from the distributed generations to the point of common coupling;

obtaining the reactive power compensation control proportion of each distributed generation based on the number of each distributed generation; and controlling, based on the reactive power compensation control proportion, each distributed generation to output the reactive power.

19. The method of claim 18, wherein a reactive power compensation control proportion $\varepsilon_{q(k)}$ of a distributed generation numbered k in the N distributed generations satisfies:

$$\varepsilon_{q(k)} = \frac{1}{N} + \left(k - \frac{N}{2}\right)G_{reg\_q},$$

wherein a reactive power $Q_{ref(k)}$ output by the distributed generation numbered k in the N distributed generations satisfies:

$$Q_{ref(k)}Q_{all}\varepsilon_{q(k)},$$

wherein k is an integer greater than or equal to 1 and less than or equal to N, wherein $$G_{reg\_q} = K_{q\_p} + \frac{K_{q\_i}}{s},$$

wherein Kg p is a second proportional coefficient, wherein $K_{q\_i}$ is a second integral coefficient, wherein s is a Laplace operator, and wherein $Q_{all}$ is the total reactive power.

20. The method of claim 11, further comprising:

collecting a current and a voltage of the point of common coupling of the power supply system;

obtaining, based on the voltage and the current of the point of common coupling, an effective value of a first oscillation component of the voltage, an effective value of a second oscillation component of the current, and an effective value of a third oscillation component of a system frequency of the power supply system; and determining, when at least one of the effective value of the first oscillation component is greater than a third threshold, the effective value of the second oscillation component is greater than a fourth threshold, or the effective value of the third oscillation component is greater than a fifth threshold, that the oscillation of the power supply system exceeds the preset threshold range.

* * * * *